June 4, 1935.  V. A. CLEMENT  2,003,578
PASTRY CAKE AND METHOD AND MOLD FOR MAKING THE SAME
Filed Aug. 9, 1933
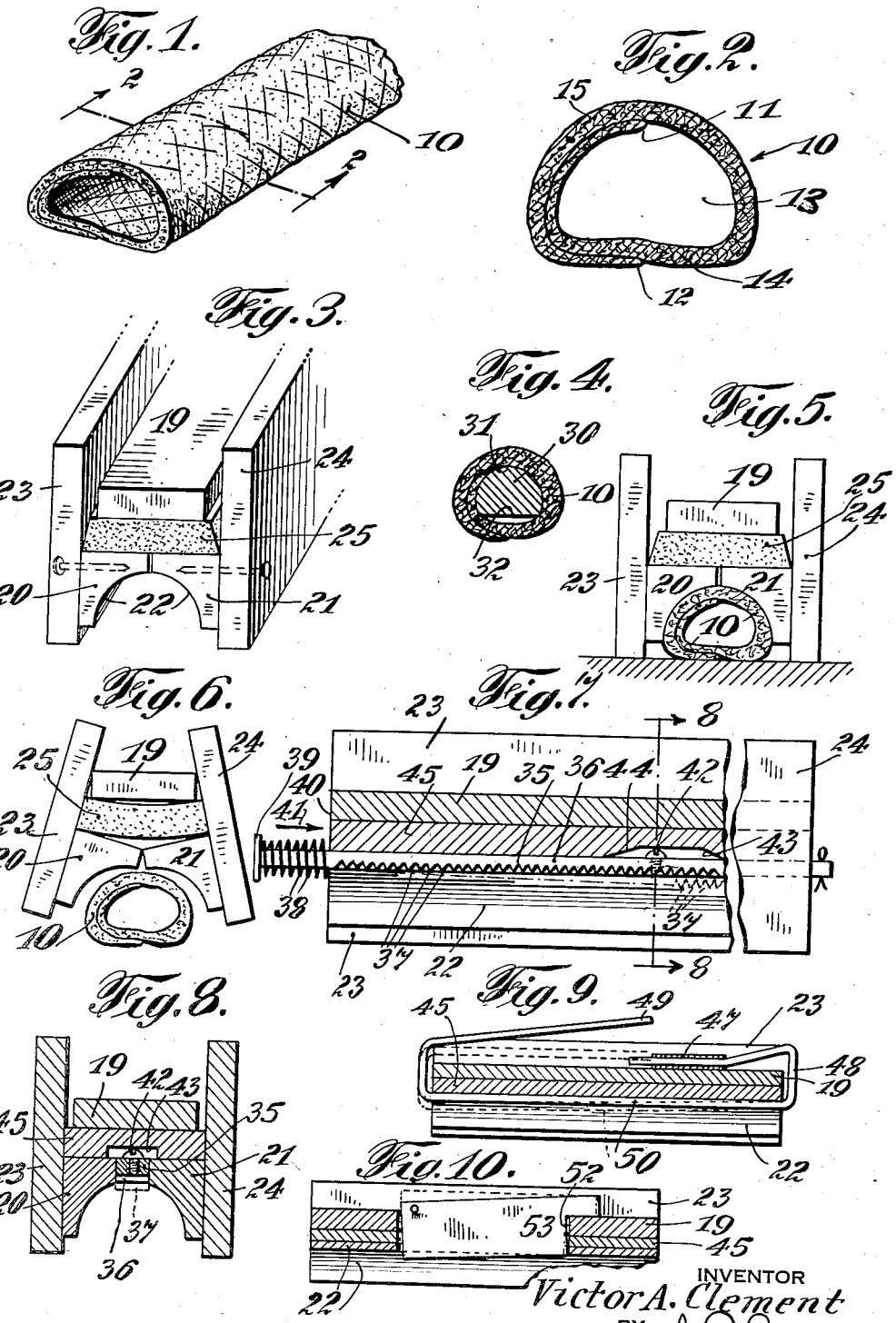
INVENTOR
Victor A. Clement
BY
his ATTORNEY Patented June 4, 1935

2,003,578

UNITED STATES PATENT OFFICE 2,003,578

PASTRY CAKE AND METHOD AND MOLD FOR MAKING THE SAME

Victor A. Clement, Bayside, N. Y.

Application August 9, 1933, Serial No. 684,433

5 Claims. (Cl. 107—1)

The invention relates to pastry cakes and consists essentially of a pastry having a flat side and opposite thereto a rounded or arch-shaped portion whereby a special decorative edible ornamentation can be applied to the rounded portion without the pastry turning or rolling over on hostess' serving-plates, and thus the messing up of the decorations or garnishings is avoided and the ornamentation remains protected.

Also, the invention comprises a method of making such pastry which consists in molding one part of the pastry into a flat shape with the opposite part extending therefrom in arch-shaped form. The flat shaped portion is molded under pressure without disturbing the fashioning of the rounded portion of the completely baked product. The invention also consists in a mold device for shaping into final shape, a partially formed pastry, the mold device fitting over the contour of the baked product so as not to disturb the rounded part while the opposite part is being flattened. The invention also includes a specially designed core upon which the thinly baked sheet is rolled to give an initial molding to the pastry.

It is also within the province of my invention to produce pastry having a flat side opposite a crowned or conically shaped portion designed to make filling of such pastry article easier, especially with a knife blade, for instance, in households not equipped with caterers' or confectioners' tools.

Also the use of a flat side built into the article before final manufacture and completion thereof so as to act as an indicator or guide or to establish points or areas for use or aid in subsequent stages of manufacture or finishing of products. The flat side also affords a base on which to stand the pastry article.

In the accompanying drawing:—

Figure 1 is a perspective view of my improved pastry;

Figure 2 is a transverse section;

Figure 3 is a perspective view of the mold;

Figure 4 is an end view showing the pastry in the process of molding;

Figure 5 is an end view showing the mold applied to the improved pastry;

Figure 6 is a sectional end view of the mold in open position; and

Figures 7 to 10, inclusive, show molds having various forms of ejector mechanisms.

Similar characters of reference indicate corresponding parts throughout the several views.

Referring to the drawing, the biscuit 10 shown in Figure 1, is made up of a dough which is baked in a flat sheet, rolled, shaped, pressed and otherwise fashioned into generally a circular cross section. The end 11 of the layer, should terminate in the baked article, in the dome or portion which is not subject to disturbance under pressure of the molding operation. The other end 12 terminates on the exterior, as shown in Figure 2. The interior of the roll is intended to be filled with a suitable appetizer, such as sardelen paste, cream cheese, or the like in the space indicated by 13. The shape of the roll includes a flat side 14 opposite a rounded portion 15.

Heretofore the shape of the transverse cross section in such pastry was cylindrical and had the disadvantage in that the curved inner surface of the cylinder's bore made it difficult for a flat knife blade carrying a filling ingredient within the bore to free such filling from the blade and leave it deposited therein. The knife blade had no parallel surface against which to work the filling inwardly nor could it clean the blade of filling by withdrawing against a parallel surface and straight edge. Curved surfaces are not advantageous surface against which to manipulate the most available implement of the household, namely, a flat knife blade, particularly when the diameter of the bore of the cylinder is small, in which case some type of caterer's or confectioner's filling tool is often resorted to, and those tools are not common in the average household. Such full cylindrical shape tends to make the cylindrical transverse cross section less desirable. Also this full cylindrical shape when being served has a tendency to roll on the hostess' serving platter.

Attempts have been made to flatten such cylindrical rolls under pressure between flat surfaces, but in the case of pastries made of thin sheets rolled up into cylinders, the flattening operation usually brought about a displacing of the inner end of the inner layer. The result was, this end became an obstruction in the bore in the path of the filling, preventing free entrance and passage of the filling ingredient when attempting to insert same in the baked article. Also as a result of this method of flattening of cylinders, it produced slit-shaped bores in transverse cross section to receive filling and this shaped bore is difficult to fill with a knife blade, though filled with suitable caterer's or confectioner's filling tools.

To overcome the objections to these former methods, the invention also comprises a mold and method for making the improved pastry. For this purpose, the pastry after having been rolled into a tube-shaped form, around a rod or core of suitable length and cross-section, as shown in Figure 4 is then placed under a mold device. This mold device is made up of two equally formed parts 20 and 21, each having a curved-like portion 22, which is adapted to conform to the shape already given to the rounded portion of the finished pastry. These portions 20 and 21 are hinged together by a piece of elastic material 25 bridging the two portions 20 and 21. The hinged parts yield in respect to each other, and relatively in respect to the article being molded, and thereby conform to the desired contour of the finished article. Sidewalls 23 and 24 are applied to the molding parts 20 and 21, which enables the mold device to be readily manipulated. An open position of the mold device is shown in Fig. 6.

In Figure 5 is shown a sectional view of the pastry and mold device after the molding pressure has been applied, and in Figure 6 is shown a similar view with the mold device being removed. The interior molding rod or core 30 gives a preliminary molding to the pastry and the exterior mold preserves the shape of the rounded portion while the portion opposite thereto is being flattened under pressure. This rod or core 30 may be of any suitable length. After the pastry has been shaped under pressure, the cake can be cut into suitable lengths, depending upon the original length, and is then ready for use. The purpose of the rod or core 30, which has a flat side 32 and a rounded top 31, is to form a substantially flat side on the tube-like pastry article, and the flat side thus formed by the flat side of the rod or core served to make filling of the bore of the baked article easier by presenting a parallel surface with straight edges, against which may be manipulated the flat blade of a knife. Said flat portion while being substantially flat, is curved somewhat, as shown in Figure 4. Such a curve is then further flattened in succeeding operations, the flat portion further serving as a marker or guide for operators, as this flat side establishes a point or area of the tube-like pastry which is important as means for indicating to the operator that the inner terminal edge 11 is within the rounded or dome portion which is not to be subjected to disturbance under pressure of the mold device. Said flat side 14 also furnishes a base on which the article will rest without tendency to roll.

After first shaping on the cylindrical device described, the baked tube-like article is further shaped under pressure of a mold device. This mold device is designed and made to fit all the rounded curves of the baked article. So that when pressure is applied, there is no disturbance in the rounded part of the structure of the tube-like pastry, while the pressure flattens the opposite portion of the pastry with a view to giving it a flat side for the reasons explained. Further, the portion opposite the flat side remains rounded, not flattened, and the resulting hole which is designed to be filled with a filling by means of a knife blade is in better shape for such filling, while the hole is kept clear of any projections on the terminal edge 11 which will interfere with filling.

Described generally, this manufactured pastry product is a tube-like article designed to be filled with various ingredients and served as a food. The pastry is baked in thin sheets or strips,— round, square, oblong, or various other shapes. Cylindrical forms or cores are used for rolling up or fashioning the sheets or strips into the tube-like pastry article. And these tubes made of pastry are further shaped by applying pressure in definite areas of the baked article with a form-giving mold device as described. The pressure must be applied in areas having a definite relation to the structure of the manufactured article. The resulting pastry article may be used in long or short lengths as originally made or may be made long and cut up in short lengths.

It is desirable to have the inside terminal 11 of the baked sheet or strip, which is within the pastry tube-like article, located in the upper portion or crown of the product, to obviate possibility of dislodging said inner terminal of the baked sheet. Dislodged from its original position, this terminal tends to block the filling space, and, as previously stated, will prevent free entry of filling ingredients. If the article be made in this way, there will be no blocking of the bore in course of manufacture which will necessitate correction.

Further to assist and facilitate revealing to the operator the proper location of said inner terminal of the baked sheet or strip within the tube-like pastry, while in course of final shaping, just prior to applying final shaping pressure, the tube-like pastry shall be made or formed with a flat side in its otherwise circular section. This flat side shall be formed in the first steps of the fashioning of the baked article. This flat side shall be used as a bottom or base on which to stand it; it will indicate and assure the operator that directly above in the crown is harbored the inner terminal of the baked sheet, properly located, ready to receive final shaping pressure to accomplish a desired result. In the first forming operation, the cylindrical device shown shall be placed on its flat side in a definite determined location on the bake sheet or strip, to assure, when the baked article has had the first forming completed, the proper relative positions of all parts of the tube-like pastry's structure. The flat side or base formed into the baked tube-like pastry in the first stages of forming, acts as a quick guide to the operator in quickly locating areas on which to apply final forming pressure correctly.

The portion 25 of the exterior mold device is made yieldable to permit the members 20 and 21 to move in respect to each other, and thus serve to eject the pressed article if for any reason it sticks to the mold. To give suitable weight to the mold device, a member 19 of metal is provided which weights down the mold device. The side walls 23 and 24 are made somewhat longer than the sides of the molding parts 20 and 21, to provide spaces into which the pastry can enter when pressure takes place, if any of the pastry does move out of the previously formed shape. The only part of the pastry which is molded by the molding portions 20 and 21, is the flat portion, which is changed from the curved portion already partially flattened to the final substantially flat side. Instead of providing the flexible member 25, another form of ejector can be used. In the embodiment shown in Figs. 7 and 8, the upper parts of the portions 20 and 21, have a recess 35, and there is movable therein a rod 36 having serrations 37. By longitudinally moving the serrated rod 36, the pastry is loosened and will not stick to the mold after the pressure has been applied. A spring 38 disposed between the shoulder 39 and the wall 40 of the mold, will serve to move the rod 36 backwardly after having been moved in the direction of the arrow 41. The rod 36 has a projection 42 which moves in a recess 43 and against the inclined sides 44 of the recess, and the rod is forced down thereby to eject the cake. A weight 19 is provided, and the wall 45 joins the two side walls 23 and 24. Another embodiment is shown in Fig. 9, in which a spring 48 is secured at 47 to the upper part of the mold, and enters into the lower part of the same within the upper part of the curved portions and extends again to the upper part of the mold in the inclined end 49. A pressure on the end 49 serves to press the body portion 50 of the spring downwardly and project it beyond the recess, to eject any pastry therein.

Another embodiment is shown in Figure 10, in which a recess 52 is provided in the mold, and in the recess there is placed a block 53 which is movable and this movable block serves to eject the pastry upon moving the block 53 against the pastry.

The flat side of the baked article possesses the advantage of presenting a straight end edge and a flat inner surface in parallelism with the flat blade of a knife. Against a flat surface the flat knife blade can be manipulated to better advantage in the process of filling the bore. The filling ingredient can be better worked inwardly and also as the knife blade is withdrawn, the filling ingredient is more readily left in the bore, due to the closer contact that is possible between the flat knife blade and the flat inner side and straight end edge of the baked article. The efficiency of filling with a knife blade is important, as the knife blade is the most generally available household implement of the average public.

In carrying out my invention in practice, it will be understood that instead of making a substantially rounded or arch shaped side opposite a flat side, both of the opposite sides of the roll may be made substantially flat.

While I have disclosed an edible article and molds in the forms illustrated, it is to be understood that I do not wish to be limited to the specific embodiments herein disclosed, but wish to include within the scope and spirit of my invention any and all modifications of the invention coming within the appended claims.

I claim:

1. The method of making a pastry adapted to receive ornamentation, which consists in first rolling sheets in intimate overlapping contact, having an open cylindrical bore, around a preliminary molding member, having a flat side and an opposite rounded portion to mold the pastry generally in conformity therewith, and finally applying pressure to the rounded part of the pastry in conformity with the member and without disturbing the layers of the pastry, and completing the flattening of the flat side, said molding operation being carried out without transposing one layer in respect to the other to clog the bore of the pastry.

2. A mold for making pastry of superposed layers, comprising an interior molding core, abutting molding members having a contour conforming to the shape of the exterior of the pastry, and adapted to be placed on the exterior of the pastry, and means for hinging said molding members together outwardly of their abutting edges whereby the pastry is ejected therefrom upon rocking of the members.

3. A mold for making pastry articles comprising two members each having a pastry forming surface, and means for hingedly securing the members together in a manner whereby the confronting portions of the members will eject the pastry when the members are rocked on their hinges.

4. A mold for making pastry articles comprising two members disposed in edge abutting relation and each having complementary pastry forming surfaces, and means engaging the members outwardly of their abutting edge to mount the members for swinging movement relative to each other, the inner edges of the members constituting an ejecting means when the members are rocked relative to each other.

5. A mold for making pastry of superposed layers, comprising an interior molding core having a flat side and a circular-shaped portion extending therefrom adapted to give the pastry an interior shape in conformity therewith, abutting molding members having a contour conforming to the shape of the exterior of the pastry, and adapted to be placed on the exterior of the pastry, and means engaging the molding members outwardly of their abutting edges to hinge the members together whereby the pastry will be ejected therefrom upon rocking of the members.

VICTOR A. CLEMENT.